United States Patent [19]

Cherry

[11] Patent Number: 5,036,588
[45] Date of Patent: Aug. 6, 1991

[54] NONVOLATILE, FAST RESPONSE WIRE CUTTER

[75] Inventor: Christopher R. Cherry, La Plata, Md.

[73] Assignee: The United States of America as represented by the Secretary of the Navy, Washington, D.C.

[21] Appl. No.: 415,736

[22] Filed: Oct. 2, 1989

[51] Int. Cl.$^5$ .............................................. B26B 17/00
[52] U.S. Cl. ........................................ 30/180; 30/228; 83/639.1
[58] Field of Search ................ 30/180, 228, 277.4, 30/278, 282, 272.1; 83/950, 639.1, 639.2, 639.4, 752, 639.7, 385, 386, 387; 114/221 A, 312, 314; 441/2, 33

[56] References Cited

U.S. PATENT DOCUMENTS

| | | | |
|---|---|---|---|
| 2,924,147 | 2/1960 | Bohl et al. | |
| 3,008,234 | 11/1961 | Mattera | 30/228 |
| 3,175,289 | 3/1965 | Wilterdink et al. | 30/180 |
| 3,209,692 | 10/1965 | Webb | |
| 3,246,396 | 4/1966 | Temple et al. | 30/180 |
| 3,322,013 | 5/1967 | Felix | 83/387 |
| 3,393,605 | 7/1968 | Parnell | 30/180 |
| 3,452,631 | 7/1969 | Brizzolara | 83/639.7 |
| 3,474,533 | 10/1969 | Peck | 30/228 |
| 3,744,369 | 7/1973 | Marziano et al. | |
| 3,848,334 | 11/1974 | Mattera | 30/180 |
| 3,885,484 | 5/1975 | Sturgis | 114/221 A |
| 3,895,552 | 7/1975 | Lagofun | 83/639.4 |
| 3,991,649 | 11/1976 | Patrichi | |
| 4,062,112 | 12/1977 | Lake | |
| 4,664,033 | 5/1987 | Burkdoll et al. | |
| 4,690,091 | 9/1987 | Persbeck | 114/221 A |
| 4,722,279 | 2/1988 | Yunan | |
| 4,809,610 | 3/1989 | Florin | |
| 4,815,382 | 3/1989 | Yunan | |

Primary Examiner—Frank T. Yost
Assistant Examiner—Hwei-Siu Payer
Attorney, Agent, or Firm—John D. Lewis; Kenneth E. Walden

[57] ABSTRACT

A device for cutting wires or performing other mechanical work functions comprised of a length of shock tube which causes mechanical movement of a piston accelerated through a barrel to cut a wire or perform mechanical impact functions. Embodiments include a multiple barrel device that can cut a plurality or wires with a high degree of simultaneously thus finding application in Explosive Ordinance Disposal (EDD).

19 Claims, 3 Drawing Sheets

NONVOLATILE, FAST RESPONSE WIRE CUTTER

STATEMENT OF GOVERNMENT INTEREST

The invention described herein may be manufactured and used by or for the Government of the United States of America for governmental purposes without the payment of any royalties thereon or therefor.

FIELD OF INVENTION

This invention relates to the field of performing mechanical motion from a stand-off distance. In particular, for providing mechanical shearing or percussion detonation, without the use of explosives. It is especially useful when the mechanical motion must be exactly or precisely timed, such as is required for cutting wires when disarming sophisticated improvised explosive devices.

BACKGROUND OF THE INVENTION

There currently exists wire cutting systems for EOD use which employ detonators and squibs. These systems produce unwanted blast and fragmentation. In addition, they are classed as explosives, can initiate the explosives in the suspect device while attempting disarmament and engage a plethora of shipping and handling concerns.

Examples of systems performing mechanical movement explosively include Yunan, U.S. Pat. No. 4,722,279 which discloses a nonelectric detonator device having a tubular shell that is closed at the bottom end and containing a base charge, a primary charge, a rupturable membrane, a holder for low energy detonating cord whereby on detonation of the detonating cord the membrane is initiated which in turn initiates the detonating explosive.

Another example is Lake, U.S. Pat. No. 4,062,112 issued Dec. 13, 1977 which teaches an explosive wire cutter using a barrel and a piston. This cutter is adaptable to various types of charge, all of which are explosive.

Patrichi, U.S. Pat. No. 3,991,649 discloses a pyrotechnic wire cutter using an explosive charge to sever a wire or wires.

Other examples of explosive devices, including wire cutters, are now in the art but suffer from a lack of precision timing as well as the concerns attendant with explosive devices.

Efforts in the field to reduce the effects of explosive devices are known to employ shock tube. These devices use the nonelectric shock tube to then ignite an initiation material which in turn ignites propellants or other explosive materials to perform work functions. Examples of these devices include Burkdoll et al., U.S. Pat. No. 4,664,033, which uses shock tube to pyrotechnically ignite a first fire material which in turn ignites a propellant which moves a ball bearing against a seat to close a valve.

Florin, U.S. Pat. No. 4,809,610, also uses shock tube in a device to time multiple detonator delays. This system also uses the shock tube to ignite a secondary charge, thus continuing the concerns surrounding the use of explosive materials.

All known uses of shock tube utilize the ignition property of the transfer tube to ignite secondary mixes of either pyrotechniques or explosive material. These, like other pyrotechnic or explosive pin-pullers or wire cutters, engender an imprecision in timing, as thermal thresholds vary. Any multiple wire cutting system using these techniques would have simultaniety variances of milliseconds or greater. Increasingly EOD applications require multiple wire cutting, with an increased degree of severance simultaniety not possible with explosive or pyrotechnic devices.

SUMMARY OF THE INVENTION

The objects and advantages of the present invention are obtained by using one or more strands of shock tube which then propels one or more pistons down one or more barrels to perform mechanical functions. This is the first known use of shock tube where the energy of the shock tube itself performs the work rather than the shock tube igniting a secondary energetic material to perform the work.

An object of the present invention is to teach a device for remotely performing mechanical work functions.

Another object is to teach a device for remotely severing wires.

Still another object of the present invention is to disclose a device that can be safely employed adjacent to the most sensitive commercial dynamites.

A further object of the present invention is to teach a wire cutter having a fast response time; that is, severs wires in microseconds with a simultaneity of severance time in less than 250 microseconds.

It is a further object to teach a device for performing pyrotechnic ignition and mechanical work functions required in theatrical special effects safely without the need for explosive detonators or high pressure squibs.

It is another object of the instant invention to teach a method of wire cutting that can engage multiple cutters as needed.

A further object is to teach a system of EOD wire cutting that is reusable.

Still another object of the present invention is to disclose a device that is low cost and constructed from readily available off-the-shelf parts.

Advantages include the ability to be initiated by multiple means including standard Nonel ® initiators, standard blasting caps, M-60 fuse igniters, EBW Bridge Heads and detonators.

The system can be manufactured from materials available from hobby shops requiring only shock tube which is classified nonexplosive and can be shipped U.P.S. or U.S. mail, therefore providing a low cost system that can be available to all military and civilian bomb squads.

Other objects, advantages, and novel features of the present invention will become apparent from the following detailed description of the invention when considered in conjunction with the accompanying drawings.

DETAILED DESCRIPTION OF THE INVENTION

Figure 1:
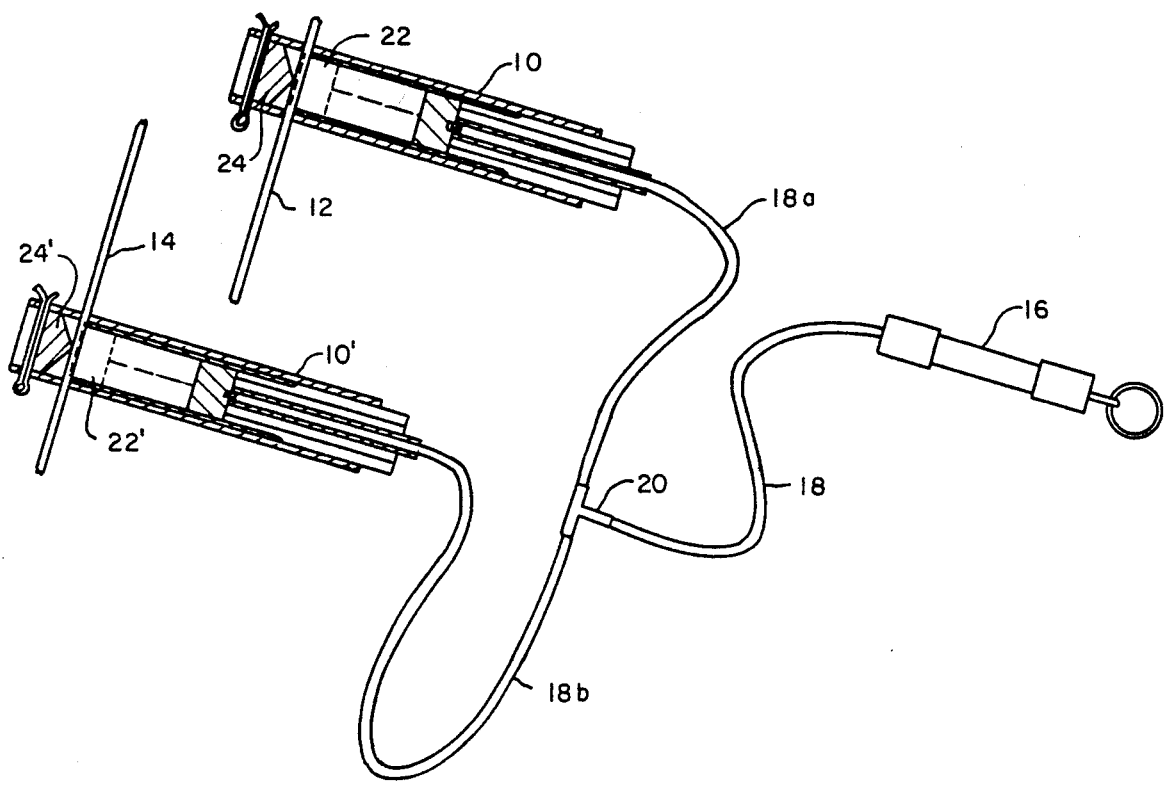
FIG. 1 is an illustration of the invention performing a cutting function.

Turning now to FIG. 1, a dual cutting embodiment is shown wherein numeral 10 and 10' are cutters of the present invention. Therein wires 12 and 14 are shown with cutters 10 and 10' attached and in position to sever wires 12 and 14 when the device is initiated by initiator 16. When initiator 16 is actuated, the shock tube 18 carries a shock through shock tube to connector 20 to a bifurcated length of shock tubing 18a and 18b, then on to cutters 10 and 10'. The arriving energy propels movable pistons 22 and 22', thereby forcing wires 12 and 14 against bladed anvils 24 and 24', severing them. FIG. 1 shows a single strand of shock tube 18 as the energy conductor. It should be noted that multiple strands of shock tube can be employed to amplify the power of the piston should a work function require additional energy without departing from the scope of applicant's invention. Testing of multiple strand devices exhibited enough power to clearly sever coaxial wiring.

FIG. 1 also shows an embodiment using two cutters to cut two wires, it should be understood that as many cutters can be assembled as is reasonably needed without departing from the scope of this invention. It is also interesting to note that testing has shown a surprising degree of simultaniety in wire severance.

Measurement of severance simultaniety repeatedly demonstrated variances less than 250 microseconds when shock tubes 18a and 18b are within one thirty-second of an inch in length relative to each other. This provides a utility whenever multiple wires must be cut with a high degree of simultaniety as is required in disarming IED's in EOD environments. When a high degree of simultaniety is desired, shock tubes 18a and 18b should be cut as short as possible to avoid amplifying any ambiguities which might be present in the two lengths of shock tubing. Shock tubing 18 may be of any practical length as the transit time of the shock wavefront through tube 18 does not effect the simultaniety.

Shock tube 18 is a nonelectric, low energy, low brisance shock signal hose well known to those in the explosive arts. This tubing differs from low energy detonating cords in that the reactive mix is only coated as a thin film on the inner surface of the tubing. This thin film of reactive material sustains the shock wave down the axis of the tube at approximately 6,500 feet per second. The tubing is a plastic, such as polyethylene, and may be coated on the outside with other materials such as Teflon.

An important feature of using shock tube is that this tubing uses only approximately one pound of explosive material in 70,000 feet of tubing, resulting in the product being classed as a nonexplosive. Available by mail or UPS, this feature makes the cutters readily accessible by civilian bomb squads and special effects applications where high explosives are undesirable.

Applicant used shock tubing by the tradename of NONEL ®, manufactured by Ensign-Bickford, of 660 Hopmeadow Street, Simsbury, Conn. 06070. Other shock tubing, such as that produced by Atlas Powder Company, may be used without departing from the scope of Applicant's invention. While Applicant consistently produced simultaniety of less than 250 microseconds using NONEL ®, no testing was performed on shock tubing manufactured by other manufactures.

In special applications where simultaniety is critical, multiple cutters can be used on each wire, i.e., two or three cutters hooked up to each wire. This results in the two cutters exhibiting the fastest performance performing the cutting. This eliminates any one cutter with a slow response time and thus improves simultaniety.

Figure 2:
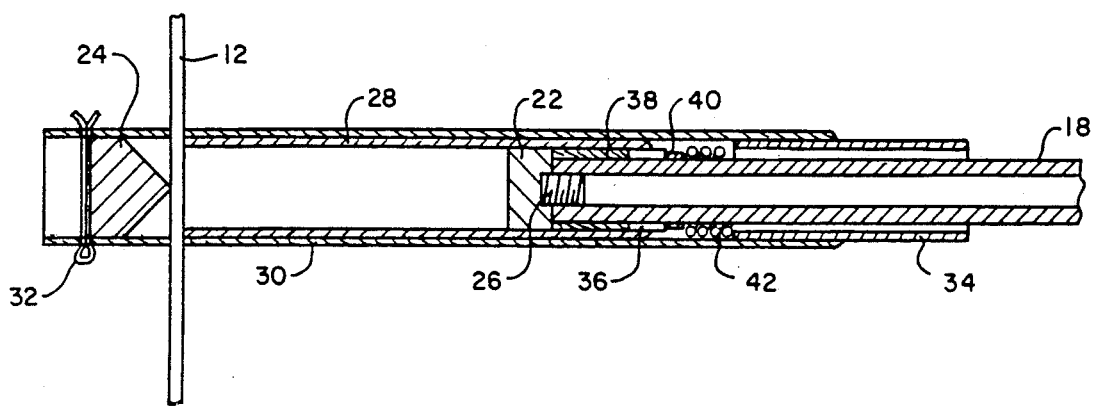
FIG. 2 is a cut away top view of the cutting assembly of FIG. 1.

A preferred embodiment may be seen in FIG. 2 which is a top sectioned perspective of cutter 10. Therein, a length of NONEL ® shock tube 18 is shown with a piston 22 threadably attached to shock tube 18 with a threaded stud 26. Other means of attachment are possible, such as soldering a wire or brad to the piston, operatively sized to frictionally engage the inner surface of the shock tube.

Upon firing the shock tube, the arriving shock pressure blows piston 22 from the end of tube 18 and accelerates it down inner barrel 28 toward wire 12. The arriving piston forces wire 12 against a sharpened anvil 24 where it is cut. Anvil 24 is mounted in outer barrel 30 and held in place by a cotter pin 32. The preferred embodiment used a coating of nonconducting lacquer over anvil 24. This lacquer helped hold anvil 24 frictionally in place within barrel 30, thus ensuring the cutting point on anvil 24 was perpendicular to the axis of wire 12 and guaranteeing a clean cut. The coating of lacquer also helped insure that no electrical shorting of wire 12 occurred during the cutting operation.

A barrel extension 34 is fixedly attached to outer barrel 30, which provides an extended handle for attaching the cutter to hard to reach wires. Hard to reach wires are those recessed within electronics and surrounded by components or any other wires positioned where a technician lacks enough clearance to grasp the wire with his fingers. It is typical with improvised explosive devices for wires to be surrounded by batteries, capacitors, shelf materials and other components sometimes as much as several feet from access openings. The entire outer surface of barrel 30 and the exposed outer surface of barrel extension 34 may be covered with insulating material such as heat shrink tubing or an insulating lacquer. This abrogates the possibility of shorting wires in an unknown device as the wire cutter is attached and operated.

Figure 3:
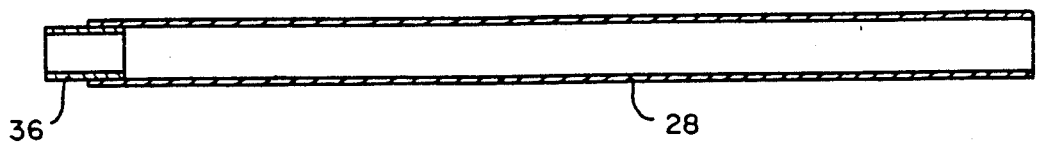
FIG. 3 is the inner barrel assembly of the cutter of FIG. 2.
Figure 4:
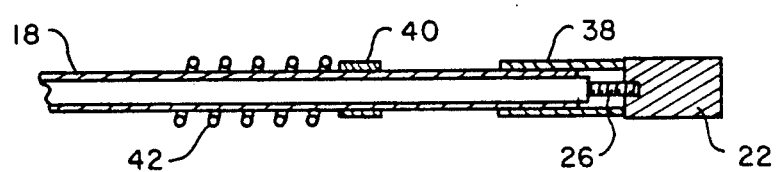
FIG. 4 is an illustration showing the attachment of the piston to the shock tube used in the cutter of FIG. 2.

A brass sleeve 36 is fixedly attached by soldering, epoxy, or crimping to barrel 28 as best seen in FIG. 3. Brass sleeve 36 provides a stop or a shoulder for abutting ridges 38 and 40 as shown in FIG. 4. These ridges are simply raised areas on the external surface of the shock tube 18 to prevent movement of the piston within inner barrel assembly 28. These ridges were formed by duct tape in the embodiments actually built and tested, however, any type of tape or material might be used as long as abutting ridges 38 and 40 are formed to abut against brass sleeve 36.

FIG. 4 shows the preparation of the end of the shock tube 18 before assembly. Therein the abutting ridge 38 is shown covering the end of shock tube 18 and the threaded stud 26, which attaches piston 22 to the shock tube. Caution should be exercised to ensure the outer diameter of abutting ridge 38 is not larger than the outer diameter of piston 22, as this assembly must slidably enter the inner barrel 28 upon assembly. A spring 42 such as that found in a ballpoint pen applies pressure to abutting ridge 40, which in turn applies pressure to abutting ridge 38 forcing and retaining inner barrel 28 up against wire 12 in position where piston 22 can sever wire 12 when it exits barrel 28. Spring 42 is sized to engage the end of barrel extension 34. When pressure is applied to shock tube 18, that is, tube 18 is pulled back and out of barrel extension 34, spring 42 collapses and abutting ridge 38 applies pressure to brass sleeve 36 thus pulling inner barrel 28 open and opening a space to insert wire 12 into position within barrel 30.

Figure 5:
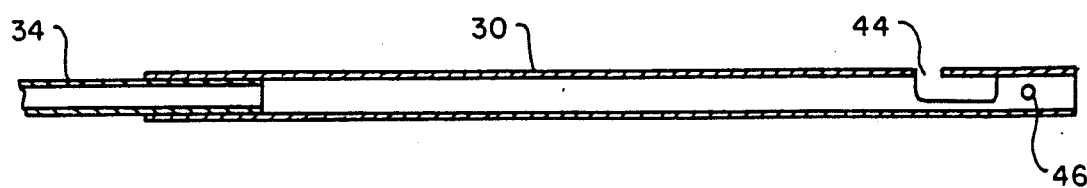
FIG. 5 is an illustration of the outer barrel assembly of the cutter depicted in FIG. 2.

FIG. 5 shows a slotted opening 44 which allows wire 12 to be inserted into cutting position when inner barrel 28 is pulled back.

Upon assembly, the shock tube 18 is prepared as shown in FIG. 4, but without ridge 40 and spring 42. The material forming ridge 40 will be applied after partial assembly into inner barrel 28 and spring 42 will be attached after that.

The shock tube as shown in FIG. 4 minus ridge 40 and spring 42 is then threaded into inner barrel 28 by first entering the initiator end of shock tube 18, that is, the end without the piston, into the inner barrel assembly 28 so that the initiation end of shock tube 18 exists from brass sleeve 36. Then the shock tube is pulled until ridge 38 abuts brass sleeve 36. Abutting ridge 40 is now applied thus holding shock tube 18 in fixed position in inner barrel 28. Spring 42 is now slid on the free end of shock tube 18 and the free end of tube 18 threaded into outer barrel 30 from the slotted end thus assembling the cutter. As the free end of chock tube 18 is pulled through outer barrel 30 and barrel extension 34, a natural stopping point will be reached as spring 42 contacts the shoulder of barrel extension 34.

Finally, bladed anvil 24 is inserted into the slotted end of outer barrel 30 where it is slid within outer barrel 30 far enough to allow cotter pin 32 to enter hole 46, thus locking it within the barrel. Caution must be taken to ensure the outer diameter of anvil 24 is operatively sized to frictionally engage the inner surface of outer barrel 30 so as to hold it in radial alignment once the anvil 24 is rotated so that the blade is perpendicular to the axis of wire 12. If the anvil is rotated so that the cutting edge of the anvil is parallel to the axis of wire 12, it is possible that the wire will slip to the side of the cutting edge of anvil 24 and not be severed. Applicant used a lacquer coating over anvil 24 which provided a friction fit, thus holding anvil 24 in position after alignment while also insulating the anvil.

With the device now assembled, the user simply pulls on the free end of the shock tube 18 while holding the cutter assembly to move inner barrel assembly 28 backwards as spring 42 compresses thus opening a free area within slotted opening to insert wire 12. Releasing the tube 18 allows spring 42 to again open and forces inner barrel 28 to engage wire 12 and trap it against the blade on anvil 24.

Applicant used common hobby shop parts to assemble this device. Outer barrel 30, inner barrel 28 and the brass ring 36 were formed from common brass tubular stock found in telescopic kits commercially available from hobby shops. The kits readily provide tubing which incrementally decreases in size with each smaller tube slidable able to enter the next larger size with a close tolerance of plus or minus 0.002 inches.

Anvil 24 and piston 22 were formed of solid brass cylindrical stock which fit tightly within the appropriate barrel. The blade on anvil 24 was simply machined to create a cutting surface. The angle forming the cutting surface may be varied to control the speed and direction of the cut ends of the wire after severing to reduce the possibility that the free ends of the severed wire remain inside the cutter and possible in shortening contact.

Figure 6:
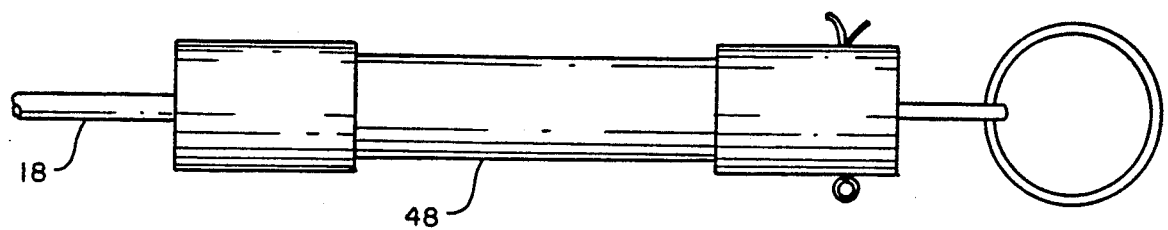
FIG. 6 is an illustration of an initiator used to initiate the cutting action of the disclosed device.

After assembly, the cutter is armed by attaching the free end of the shock tube to an initiator, (see FIG. 6). Many different types of initiators known to those skilled in the explosive arts will function as the triggering force to operate Applicant's device. FIG. 6 shows an M60 fuse lighter 48 available throughout the military supply system which was generally used to test Applicant's device. Other devices tested by Applicant and known to function adequately as an igniter are exploding bridge wire (EBW) bridge heads, EBW detonators, a NONEL ® initiator available from Ensign-Bickford, standard blasting caps and various small bore cartridge primers.

Figure 7:
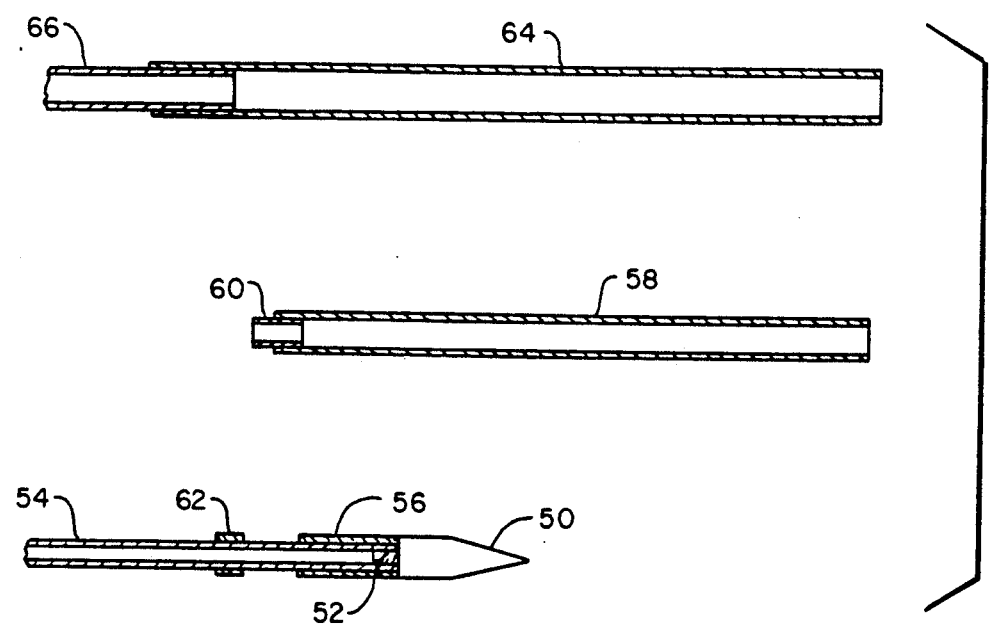
FIG. 7 is an exploded parts illustration of another embodiment of the invention used to perform mechanical puncturing.

FIG. 7 is a separated parts illustration of another embodiment of Applicant's invention where the action of a shock tube is employed to drive a sharpened piston into a workpiece. This embodiment might find utility whenever a workpiece needed to be penetrated and multiple hookups could be made when more than one workpiece needed to be penetrated with a high degree of simultaniety.

Turning now to FIG. 7, a pointed projectile 50 is attached by a threaded stud 52 to the end of a length of shock tube 54 as described above. An abutting ridge 56 is formed of tape or other suitable material. The initiator end of shock tube 54 is inserted into an inner barrel 58 and pulled through until abutting ridge 56 abuts against brass sleeve 60. Abutting ridge 62 is then applied to shock tube 54 thus locking it in place within inner barrel 58. This assembly is then inserted into outer barrel 64 and pulled through until brass sleeve 60 abuts against barrel extension 66, thus completing assembly.

This embodiment is the fixedly placed with the open end of barrel 64 adjacent to the workpiece so that when the shock tube 54 is initiated, projectile 50 exits barrel 64 and penetrates a workpiece.

It should be noted that projectile 50 could be machined to the shape of a firing pin and used to initiate small arms cartridges and other primer initiated ordnance. In this case, means to fixably mount the device in operative proximity to the primer workpiece would be constructed by standard methods known to those in the ordnance arts.

It is intuitive that the movable piston used to perform work functions in the hereindescribed embodiments could be shaped in many and varied ways dictated by the mechanical function to be performed. Obviously, many modifications and variations of the present invention are possible in light of the above teachings. It is therefore to be understood that within the scope of the appended claims, the invention may be practiced otherwise than as specifically described.

What is claimed is:

1. A, low energy, device for performing mechanical work functions on a workpiece comprising:
an outer barrel having a first end containing a slotted opening to allow entry of a workpiece perpendicular to a longitudinal axis of said outer barrel and a second end; and
an inner barrel having a first end and a second end slidably disposed within said second end of said outer barrel; and
a piston slidably disposed within said inner barrel, responsive to
a shock tube having a first end fixedly retained in said second end of said inner barrel; and a bladed anvil spaced within said first end of said outer barrel with the blade of said bladed anvil opposing said piston in said inner barrel and a shock tube initator attached to said second end of said shock tube for initiating said shock tube whereby movement of said piston in response in initiation of said shock tube would impact the workpiece extending through said slotted opening in said outer barrel between said piston and said bladed anvil thus cutting the workpiece.

2. A device according to claim 1 wherein:
said bladed anvil is fixedly mounted within said first end of said outer barrel, and said outer barrel has a pair of opposing openings allowing insertion of the workpiece through said outer barrel with said openings operatively spaced in said first end of said outer barrel whereby movement of said piston passes said openings in said outer barrel immediately before impacting said bladed anvil cutting the workpiece.

3. A device according to claim 1 wherein said piston having a leadin edge shaped like a pointed end to perform a mechanical puncture on the workpiece.

4. A device according to claim 1 wherein said piston having a leading edge shaped like a firing pin whereby a percussion primer workpiece is initiated upon movement of said piston.

5. A device according to claim 1 further comprising at least one barrel extension attachable to said second end of said outer barrel forming an extended handle.

6. A device according to claim 5 further comprising a nonconductive coating over the outer surface of said outer barrel and said barrel extensions.

7. A device according to claim 6 wherein said nonconducting coating is lacquer.

8. A coating according to claim 6 wherein said bladed anvil is coated with a nonconductive heat shrink tubing.

9. A device according to claim 1 further comprising a spring encircling said inner barrel operatively mounted so as to releasingly force said first end of said inner barrel in contact with said bladed anvil.

10. A device according to claim 1 wherein said piston is percussion initator.

11. A device according to claim 10 wherein said percussion initiator is an M60 military fuse lighter.

12. A, low energy, device for performing mechanical work functions on a workpiece comprising:
a shock tube having a first end and a second end; and
an inner barrel having a first end to encompass said second end of said shock tube, and a second tube and
a piston having a first end, and a second end responsive to said second end of said shock tube slidably disposed within said inner barrel; and
an outer barrel encompassing said inner barrel; and
a shock tube initiator attached to said first end of said shock tube whereby energy is transferred from said first end to said second end of said shock tube upon initiation, which causes said piston to transit from said first end of said inner barrel to said second end of said inner barrel where a mechanical work function is performed on the workpiece in response to the arrival of said piston.

13. A device according to claim 12 wherein said outer barrel contains openings which are sized to allow entry of a wire workpiece up to an 18 gauge electrical wire.

14. A device according to claim 12 wherein said piston is sharpened on its first end whereby a puncturing of the workpiece is accomplished when said shock tube is initiated.

15. A device according to claim 14 further comprising a nonconducting coating disposed on the outer surface of said outer barrel.

16. A device according to claim 12 wherein said first end of said piston is shaped like a firing pin whereby a primer workpiece can be initiated when said shock tube is initiated.

17. A device according to claim 12 further comprising a bladed anvil operatively disposed in said outer barrel whereby a blade on said bladed anvil cuts the workpiece in cooperation with said piston.

18. A, low energy, device for performing mechanical work functions on a plurality of workpieces comprising:
a plurality of shock tube each having a first end and a second end; and
a plurality of outer barrels each having a first end and a second end in relation to said second end of each shock tube and having a pair of opposing openings perpendicular to the longitudinal axis of said outer barrel disposed within said second end of said outer barrel; and
a plurality of inner barrels slidably disposed within said second ends of said outer barrels, and
a shock tube initiator for initiating said first ends of said shock tubes, an
a plurality of pistons responsive to said second ends of said shock tubes slidably disposed within said inner barrels; and
a plurality of bladed anvils fixedly mounted within said outer barrels in fixed relation to said opposing openings whereby the movement of said pistons would impact the blades of said bladed anvils thereby cutting the workpieses extending through said opposing openings across the center of said outer barrels.

19. A device according to claim 18 further comprising a plurality of springs encircling said plurality of inner barrels whereby saidd inner barrels are releasingly held in engagement with the workpieces.

* * * * *